United States Patent
Polewczyk et al.

(10) Patent No.: US 12,548,363 B2
(45) Date of Patent: Feb. 10, 2026

(54) DETECTING TABLES IN DOCUMENTS

(71) Applicant: SAP SE, Walldorf (DE)

(72) Inventors: Marek Polewczyk, Berlin (DE); Marco Spinaci, Versailles (FR)

(73) Assignee: SAP SE, Walldorf (DE)

(*) Notice: Subject to any disclaimer, the term of this patent is extended or adjusted under 35 U.S.C. 154(b) by 328 days.

(21) Appl. No.: 18/381,874

(22) Filed: Oct. 19, 2023

(65) Prior Publication Data

US 2025/0131761 A1  Apr. 24, 2025

(51) Int. Cl.
*G06V 30/416* (2022.01)
*G06V 30/10* (2022.01)
*G06V 30/412* (2022.01)

(52) U.S. Cl.
CPC ............ *G06V 30/416* (2022.01); *G06V 30/10* (2022.01); *G06V 30/412* (2022.01)

(58) Field of Classification Search
CPC ..... G06V 30/10; G06V 30/412; G06V 30/416
See application file for complete search history.

(56) References Cited

U.S. PATENT DOCUMENTS

| 2023/0237100 A1* | 7/2023 | Ferreira ............... G06V 10/82 707/755 |
| 2024/0104951 A1* | 3/2024 | Gu ................ G06V 30/19173 |
| 2024/0177011 A1 | 5/2024 | Polewczyk et al. |

OTHER PUBLICATIONS

Luo, et al. (Deep Structured Feature Networks for Table Detection and Tabular Data Extraction from Scanned Financial Document Images). (Year: 2021).*
Smock, Brandon, et al., "PubTables-1M: Towards comprehensive table extraction from unstructured documents", arXiv:2110.00061v3 [cs.LG], (Nov. 18, 2021), 1-10.

* cited by examiner

*Primary Examiner* — Daniel G Mariam
(74) *Attorney, Agent, or Firm* — SCHWEGMAN LUNDBERG & WOESSNER, P.A.

(57) ABSTRACT

Various examples are directed to systems and methods for determining table data from a document image depicting a plurality of words and at least one table comprising at least a portion of the plurality of words. For example, Optical Character Recognition (OCR) data may be determined based on the document image. A table detection model may be executed based at least in part on the OCR data.

20 Claims, 7 Drawing Sheets

DETECTING TABLES IN DOCUMENTS

BACKGROUND

Optical Character Recognition (OCR) includes techniques for digitally capturing information from an image of a document such as, for example, identifying words, numbers, letters, and/or other symbols from the image. For example, OCR is used to input an image of a document to a computing system. The result of the OCR may include an identification of words, numbers, letters, and/or other symbols depicted in the image as well as, for example, the location of the words, numbers, letters, and/or other symbols.

BRIEF DESCRIPTION OF DRAWINGS

The present disclosure is illustrated by way of example and not limitation in the following figures.

DETAILED DESCRIPTION

A recurring challenge in OCR processing is identifying tables that are depicted by a document. A table may comprise various elements including rows and columns as well as other elements such as, row headers, column headers, and spanning cells. Consider the example TABLE 1 below:

TABLE 1

|          |       | Column 1 | Column 2 | ... | Column Y |
|----------|-------|----------|----------|-----|----------|
| Row Cat. | Row 1 | Text A   | Number D | ... | Text G   |
|          | Row 2 | Text B   | Number E | ... | Text H   |
|          | ...   | ...      | ...      | ... | ...      |
|          | Row X | Text C   | Number F | ... | Text I   |

Example TABLE 1 comprises X rows labeled Row 1, Row 2, . . . . Row X and Y columns labeled Column 1, Column 2, . . . . Column Y. Each row and each column comprises a plurality of alphanumeric strings that can be detected with OCR processing. TABLE 1 also shows an example spanning cell labeled "Row Cat." The spanning cell "Row Cat." applies to both Row 1 and Row 2. The labels for the columns (e.g., Column 1, Column 2, . . . . Column Y) may be examples of column headers.

An OCR computing system may utilize OCR processing to detect the specific words included in a document, including words included in any tables depicted in the document. In various examples, however, other techniques may be used to extract the structure of the table itself. For example, an OCR computing system may apply an additional large object detection model to a document image to identify tables in the document image. Examples of suitable large object detection models include Faster R-CNN and Detection Transformer (DETR). When applied to the document image, the large object detection model may provide an output including output boxes corresponding to each table element.

Techniques involving the use of a large object detection model applied directly to the document image, however, may have certain disadvantages. For example, training a large object model may be time and resource intensive. Also, applying a large object detection model to a document image may consume significant processing resources. In some examples, OCR computing systems applying separate large object detection models may use additional processing hardware such as, for example, additional Graphics Processing Units (GPUs) or other suitable hardware processors. Another challenge associated with large object detection models is that many large object detection models are configured to predict non-rotated bounding boxes. This limits the accuracy of the large object detection models for documents in which a table is rotated or skewed.

Another complication with using large object detection models for detecting tables in documents is related to training. For example, many large object detection models are trained with training images that simulate all of the expected images that will be seen during real-world use of the large object detection model. This may include obtaining and training with grayscale images, color images, tables including dark text on a light background, tables including light text on a dark background, and/or the like.

Various examples address these and other challenges by performing table detection using a table detection model that operates on OCR data derived from a document image. For example, the OCR data may comprise a plurality of word records. The word records may correspond to words depicted by the document image. The words may comprise alphanumeric strings made up of letters, numbers, symbols and/or the like. A word may correspond to a natural language word, number, and/or the like. Word records generated by An OCR process may comprise location data describing a location of the word in the document image and content data describing a definition or other identity of the word.

A table detection model may be trained and may receive as input the OCR data from a batch of words depicted by the document. The table detection model, in some examples, may be arranged as a transformer model configured to identify correlations between words. For example, the table detection model may be configured to identify correlations between words that are part of a common table or table element, such as a row, column, header, row header, or spanning cell. Correlations determined by the table detection model may be used to generate bounding boxes for the table and table elements based on the location data for the corresponding words generated by the OCR process.

In various examples, the table detection model may utilize an attention mechanism. An output of the table detection model (e.g., from a stage of the table detection model prior to the at least one head) comprises an intermediate matrix.

The transformer model may be trained such that the intermediate matrix comprises information that correlates words from the document image that are related, such as in a common table or table element. The matrix may be divided into two matrices, where each of the two matrices has a size that is one half of the size of the original intermediate matrix. The two matrices may be combined in an attention mechanism to generate a correlation matrix. The correlation matrix may comprise a plurality of entries, where each entry corresponds to a combination of two words described by the input to the table detection model.

The OCR computing system may utilize the correlation matrix to identify words that are part of a common table or table element. The OCR computing system may further identify a bounding box for the tables and/or table elements identified by the correlation matrix-based on the location data of the OCR data used as input to the table detection model.

In this way, the OCR computing system may extract table data from a document image using OCR data generated by an OCR process. In some examples, further analysis of the document image itself may be omitted or minimized. Also, in various examples the techniques described herein utilizing a transformer model may be robust when considering tables that are skewed or rotated. For example, the OCR process may be arranged to detect text that is skewed or rotated, which other techniques such as large object models may struggle to identify. For example, the table detection model described herein may generate the locations of table elements based on the location data generated by the OCR process, which may already account for any skewing or rotation. Also, in some examples, OCR may already be trained to account for noise due to different imaging conditions such as, for example, different lighting conditions, different text colors, and/or the like. Accordingly, an OCR method may not encounter the same training complications as large object models.

Figure 1:
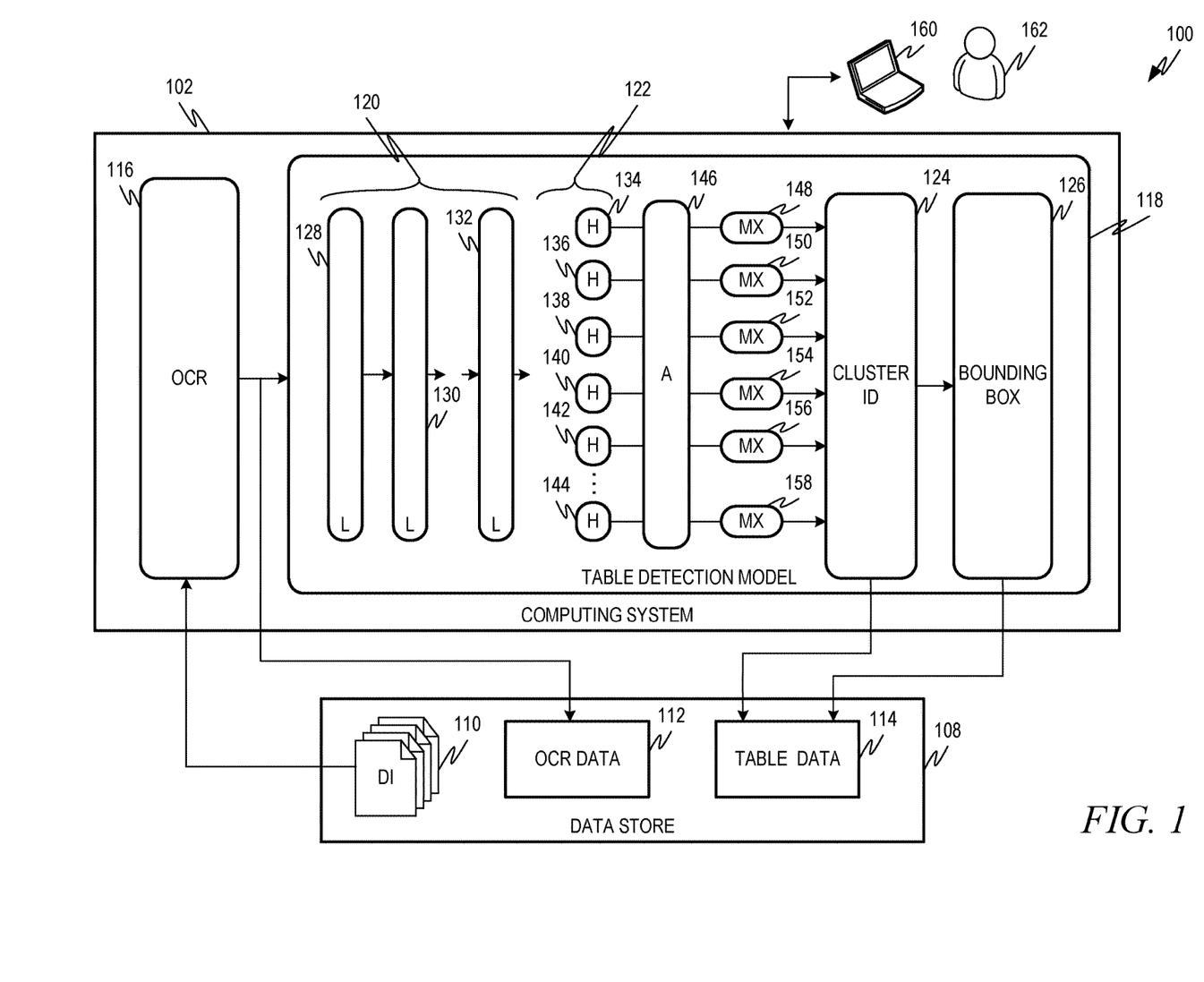
FIG. 1 is diagram showing one example of an environment for using a computing system to detect tables depicted by document images using OCR data generated from the document images.

FIG. 1 is diagram showing one example of an environment 100 for using a computing system 102 to detect tables depicted by document images 110 using OCR data generated from the document images 110. The environment 100 comprises a computing system 102 and a data store 108. The computing system 102 may be or include any suitable computing device or systems. In some examples, the computing system 102 is or includes a cloud deployment. For example, the computing system 102 may be executed by one or more server computing devices at a common geographic location and/or distributed across multiple geographic locations. In other examples, the computing system 102 is implemented in an on-premise arrangement including one or more server computing systems. For example, in an on-premise arrangement, the computing system 102 may include one or more server computing devices built and/or maintained by an entity associated with users of the computing system 102.

The data store 108 may be or include a database or other suitable data storage component in communication with the computing system 102. The data store 108 may comprise a single storage device at a single geographic location and/or may utilize multiple storage devices at a single geographic location and/or distributed across multiple geographic locations. The data store 108 may store document images 110, OCR data 112, and table data 114.

The computing system 102 may execute an OCR process 116 and a table detection model 118. The OCR process 116 may be an executable software component that is configured to generate OCR data 112 from one or more document images 110. The OCR process 116 may be configured to implement any suitable OCR algorithm such as, for example, optical character recognition, optical word recognition, intelligent character recognition, intelligent word recognition, and/or the like.

The OCR process 116 may receive one or more document images 110 as input. Document images 110 may be digital images with each document image 110 depicting a document or a page of a document. Document images 110 may be expressed in any suitable format such as, for example, Joint Photographic Experts Group (JPEG), Portable Network Graphics (PNG), Portable Document Format (PDF), and/or the like. Document images 110 may be generated, for example, by scanning one or more physical document pages, by capturing images of one or more physical document pages, and/or may be generated electronically.

The OCR process 116 may analyze the document images 110 to extract OCR data 112. The OCR data 112 corresponding to a document image 110 may describe a plurality of words depicted by the document image. For example, the OCR data 112 may comprise word records for each word detected in the document image 110. The word record for a word may comprise location data describing a location of the word in the document image and content data describing the content of the word. The location data may be expressed in any suitable format such as, for example, one or more two-dimensional positions associated with the word. In some examples, location data may comprise two two-dimension positions, a first position corresponding to one corner of a bounding box indicating a position of the word and a second position corresponding to another corner of the bounding box. In this way, the location data may account for words that are skewed or rotated The content data for a word may indicate an identity of the word. For example, the content data may include a definition of the word and/or a pointer to a definition entry for the word at a dictionary or other similar data store. If the word is or includes a numerical value, for example, the content data may indicate a value of a number or numbers. In some examples, the content data may include American Standard Code for Information Interchange (ASCII) or other suitable indications of alphanumeric characters and/or symbols included in the word.

The OCR data 112 generated by the OCR process 116 may be stored at the data store 108 and/or otherwise utilized by the computing system 102. The OCR data 112 may also be provided as input to a table detection model 118. The table detection model 118 may utilize the OCR data 112 to identify and characterize tables and table elements that are depicted by the document images 110.

The table detection model 118, in some examples, is a transformer model. A transformer model may be a type of machine learning model that relies on an attention or self-attention mechanism to find dependencies between inputs to the model. In this example, the table detection model 118 is configured to find dependencies between word records of the OCR data 112 that are part of a common table or table element.

The table detection model 118 comprise model layers 120 and a head layer 122. The model layers 120 and head layer 122 may implement a transformer model. The model layers 120 and head layer 122 may be arranged as a neural network model. Each of the layers 128, 130, 132, 122 may comprise a number of nodes that act on a layer input to generate a corresponding layer output. Although three layers 128, 130, 132 are shown prior to the head layer 122, it will be appreciated that the table detection model 118 may comprise any suitable number of layers including more or fewer than the number shown.

An input layer 128 may receive as input a batch of sequences having a shape <batch size, sequence length, embedding size>. Each sequence may comprise a set of word records corresponding to a sequence of words depicted sequentially in a document image 110. The batch size may indicate a number of sequences being provided to the table detection model 118. The embedding size may be a property of the table detection model 118 that is selected at model creation and/or training. The input layer 128 may generate a layer output that is provided to the next layer 130. The next layer 130 generates its own layer output and provides it to the next layer, and so on until each layer provides a corresponding layer output. The layer outputs generated by the respective layers 128 may have the shape <batch size, sequence length, embedding size>.

The head layer 122 comprises one or more heads 134, 136, 138, 140, 142, 144. The heads 134, 136, 138, 140, 142, 144 are configured during training of the table detection model 118 to receive and output of the prior layer 132 and generate respective layer outputs. The layer outputs of the respective heads one or more heads 134, 136, 138, 140, 142, 144 may be expressed as matrices having the shape <batch size, sequence length, embedding size>. The respective heads 134, 136, 138, 140, 142, 144 are trained to generate outputs describing correlations between the words of the input. Different heads 134, 136, 138, 140, 142, 144 are trained to identify difference correlations corresponding to different table elements. For example, head 134 may be trained to identify correlations between words that are part of a common table. Head 136 may be trained to identify correlations between words that are part of a common row at a table. Head 138 may be trained to identify correlations between words that are part of a common column at a table. Head 140 may be trained to identify correlations between words that are headers for a table. Head 142 may be trained to identify correlations between words that are row headers or a table. Head 144 may be trained to identify correlations between words that are spanning cells for a table. Although six heads 134, 136, 138, 140, 142, 144 are shown in FIG. 1, it will be appreciated that the table detection model 118 may be with more or fewer heads than are shown. Also, different heads may be arranged to identify correlations between words that are clustered into different table elements than those given in the examples herein.

The table detection model 118 may also comprise an attention process 146. The attention process 146 is an executable software component and/or a portion of an executable software component. The attention process 146 receives the output of the respective heads 134, 136, 138, 140, 142, 144 and applies an attention technique to generate respective correlation matrices 148, 150, 152, 154, 156, 158. Applying the attention technique may involve dividing the layer outputs of the respective heads 134, 136, 138, 140, 142, 144 into two respective matrices of shape <batch size, sequence length, embedding size/2>. For example, each respective layer output may be divided into a key matrix and the query matrix. The respective key matrices and query matrices may be combined to generate the respective correlation matrices 148, 150, 152, 154, 156, 158.

In some examples, the correlation matrices 148, 150, 152, 154, 156, 158 are generated by finding dot scores for the respective query matrices and key matrices generated by the respective heads 134, 136, 138, 140, 142, 144. Dot scores may be found, for example, as given by EQUATION 1 below:

$$\text{dot\_scores} = \frac{QK^T}{\sqrt{d_k}} \quad [1]$$

In EQUATION [1], Q is the query matrix, K is the key matrix and $d^k$ is a dimension of the vectors (e.g., rows) of the query matrix and key matrix. In some examples, a sigmoid function may be applied to the dot scores to generate the respective correlation matrices 148, 150, 152, 154, 156, 158, for example, as given by EQUATION [2] below:

$$\text{sigmoid}(\text{dot\_scores}) \quad [2]$$

In various examples, this results in correlation matrices 148, 150, 152, 154, 156, 158 comprising elements representing correlation scores with a value between 0 and 1, with values above 0.5 indicating a positive correlation between respective words. The correlation scores in the respective correlation matrices 148, 150, 152, 154, 156, 158 indicate a likelihood that the corresponding words are part of a common table element.

A labeled example table correlation matrix is provided by MATRIX [2] below:

| MATRIX [2] | | | | |
|---|---|---|---|---|
| | W1 | W2 | W3 | ... WN |
| W1 | X | T(W1, W2) | T(W1, W3) | T(W1, WN) |
| W2 | T(W2, W1) | X | T(W2, W3) | T(W2, WN) |
| W3 | T(W3, W1) | T(W3, W2) | X | T(W3, WN) |
| ... | | | | |
| WN | T(WN, W1) | T(WN, W2) | T(WN, W3) | X |

The example MATRIX [2] is generated from a sequence of N words by a head, such as example head 134, that is trained to generate correlations indicating the likelihood that two words are part of a common table. In this example, each element of the matrix corresponds to a combination of two words from the sequence of N words. The value of an element T(x, y) a correlation score describing the likelihood that the two words are part of the same table. As described herein, the value for the elements T(x, y) may be between 0 and 1, with values above 0.5 indicating a positive correlation between respective words.

The respective correlation matrices 148, 150, 152, 154, 156, 158 are provided to a cluster identification process 124. The cluster identification process 124 is an executable software component and/or a portion of an executable software component that is configured to determine clusters of words from the respective correlation matrices 148, 150, 152, 154, 156, 158. The clusters of words may include a subset of the plurality of words described by the OCR data 112 that are correlated to one another. Accordingly, the clusters of words identified by the cluster identification process 124 may represent words that are part of a common table element. For example, clusters of words generated from the correlation matrix 148 may include words that are part of a common table. Clusters of words generated from the correlation matrix 150 may include words that are part of a common row at a table. Clusters of words generated from the correlation matrix 152 may include words that are part of a common column at a table, and so on. In this way, the cluster identification process 124 may output indications of table elements and words that are part of those table elements.

The clusters of words generated by the cluster identification process may be stored as table data 114 at the data store 108 and also provided to a bounding box process 126. The bounding box process 126 is an executable software component and/or a portion of an executable software component that is configured to determine bounding boxes for the table elements identified by the cluster identification process 124. The bounding boxes of the respective table elements may be determined based on the bounding boxes for the words making up the respective table elements. For example, the bounding box process 126 may be programmed to generate a bounding box that encompasses the bounding boxes of all of the words that are part of a respective table element. Bounding boxes generated by the bounding box process 126 may also be stored with table data 114 at the data store 108.

It will be appreciated that OCR data 112 and table data 114 may be used in various different ways. In some examples, a document image 110 and its corresponding OCR data 112 and table data 114 may be combined into a common file comprising an image of the document, as well as embedded OCR and table data.

The environment 100 of FIG. 1 also includes a user 162 that may access the computing system 102 via a user computing device 160. The computing system 102 may provide the user 162 with a user interface, for example, via the user computing device 160. The user interface may facilitate the provision of operating parameters and/or other instructions from the user 162 to the computing system 102. In various examples, the user interface may be used to provide OCR data 112 and table data 114 to the user 162, either independently or as a combined file including a document image 110 and its corresponding OCR data 112 and table data 114. Also, although one user 162 and one user computing device 160 are shown in FIG. 1, it will be appreciated that the computing system 102 may support multiple users and multiple user computing devices.

Figure 2:
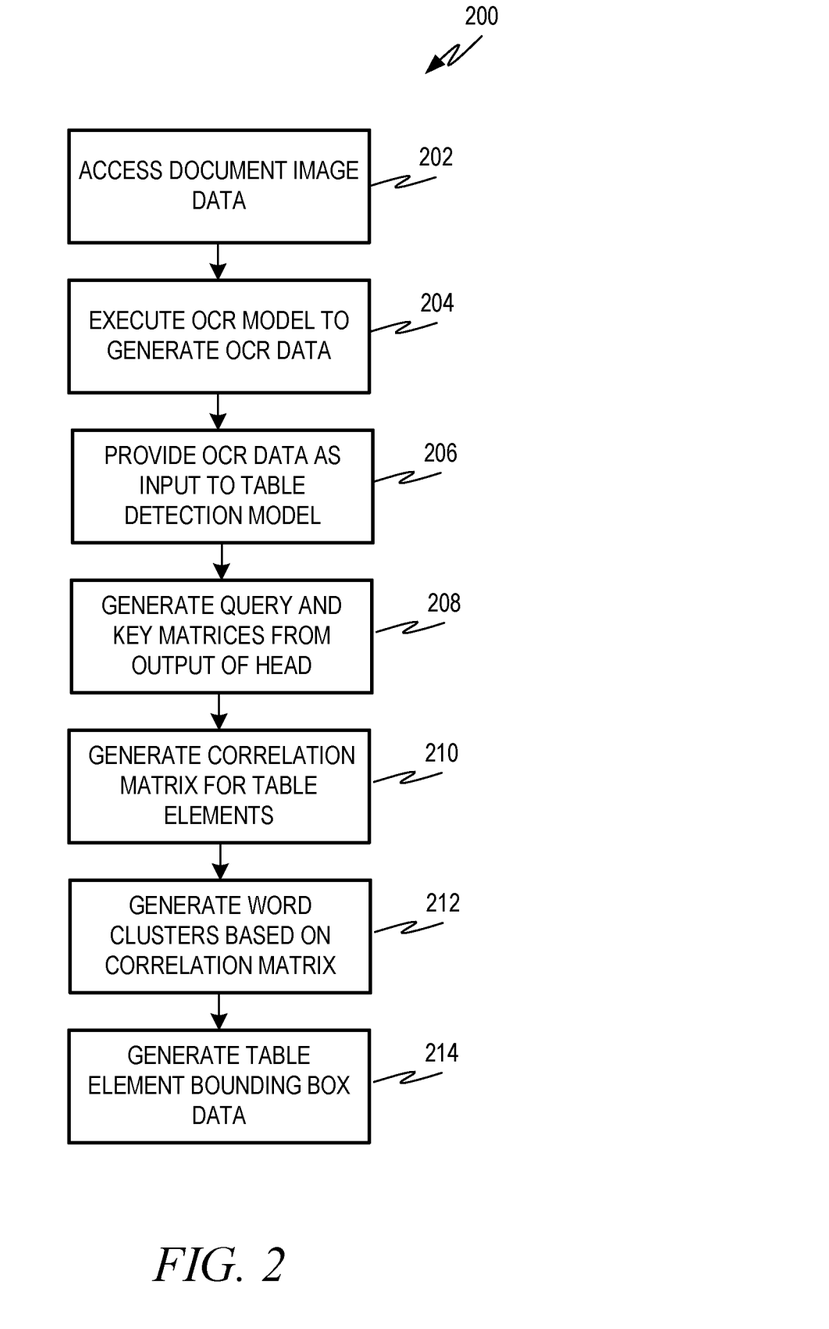
FIG. 2 is a flowchart showing one example of a process flow that may be executed in the environment of FIG. 1 to generate table data from a document image.

FIG. 2 is a flowchart showing one example of a process flow 200 that may be executed in the environment 100 of FIG. 1 to generate table data 114 from a document image 110. The example of FIG. 2 describes the operation of a single head configured to identify table elements of a single type, such as, for example words that are part of a common table.

At operation 202, the computing system 102 accesses one or more document images 110, for example from a data store such as the data store 108. At operation 204, the computing system 102 may execute an OCR process 116 to generate OCR data 112 from the document image(s) 110. At operation 206, the computing system 102 may provide the OCR data 112 as input to the table detection model 118. For example, the computing system 102 may provide the OCR data as batches of sequences to an input layer 128 of the table detection model 118.

At operation 208, the table detection model 118 may generate query and key matrices from the output of the head. At operation 210, the computing system (e.g. the attention process 146) may generate a correlation matrix for the table elements. This may be generated from the query and key matrices, for example, as described herein with respect to EQUATIONS [1] and [2].

At operation 212, the computing system 102 (e.g. the cluster identification process 124) may generate clusters of words from the correlation matrix. Each cluster of words, as described herein, may indicate a subset of the words indicated by the OCR data 112 that are part of a common table element. At operation 214, the computing system 102 (e.g., the bounding box process 126) may generate table element bounding box data describing bounding boxes for the table elements identified based on the clusters from operation 212. The word clusters generated at operation 212 and the table element bounding box data generated at operation 214 may be stored at the data store 108 as table data 114.

Figure 3:
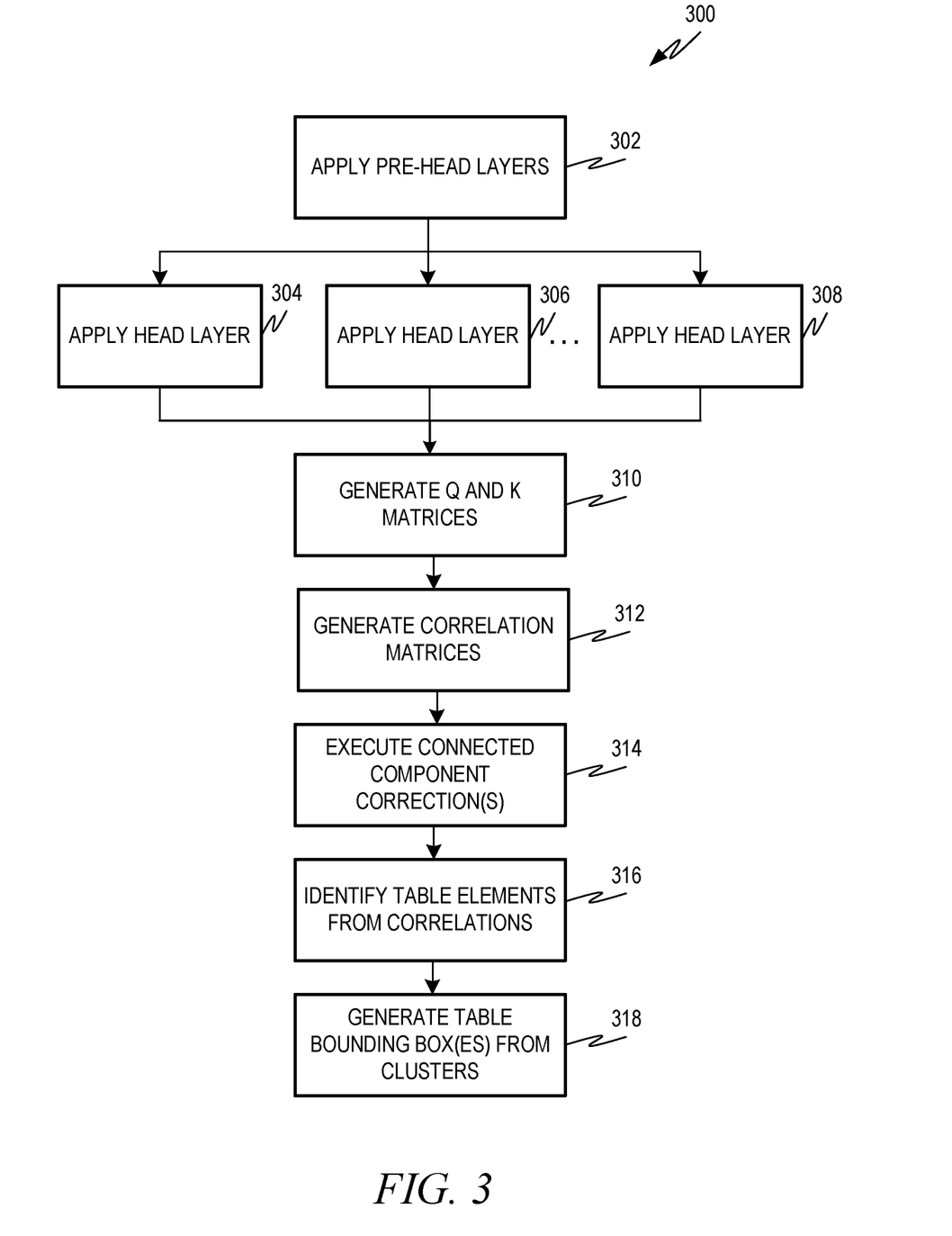
FIG. 3 is a flowchart showing one example of a process flow that may be executed in the environment of FIG. 1 to generate table data from a document image.

FIG. 3 is a flowchart showing one example of a process flow 300 that may be executed in the environment 100 of FIG. 1 to generate table data 114 from a document image 110. The example of FIG. 3 describes an arrangement in which multiple heads 134, 136, 138, 140, 142, 144 operate in parallel. At operation 302, the computing system 102 applies pre-head layers 120 to OCR data 112 received as input data. At operations 304, 306, 308, respective head layers may be applied. The example of FIG. 3 shows three head layers being applied in parallel. It will be appreciated, however, that the table detection model 118 may comprise any suitable number of head layers programmed to identify any suitable number or arrangement of table elements.

At operation 310, the computing system 102 (e.g., the attention process 146) generates query and key matrices for the respective heads, for example, as described herein. At operation 312, the computing system 102 (e.g., the attention process 146) generates correlation matrices for each of the sets of query and key matrices determined at operation 310.

At operation 314, the computing system 102 may execute connected component corrections on the correlation matrices. A connected correlation correction may address element pairs for which a correlation matrix indicates correlation in only one direction. Referring again to MATRIX [2] herein, note that the correlation matrix comprises two elements corresponding to each set of two words Wx, Wy. For example, the correlation matrix will comprise one element indicating the correlation between Wx and Wy and a second element indicating the correlation between Wy and Wx. In some examples, the correlations should be the same. That is, if a word Wx is correlated to a word Wy, then the word Wy should also be correlated to the word Wx. In practice, this may not always be the case. Connected component corrections may involve modifying one or more elements of the correlation table to either add correlations or subtract correlations such that combinations of words indicated to be correlated by one element corresponding to the words are also indicated to be correlated by the other elements corresponding to the words.

At operation 316, the computing system 102 (e.g. the cluster identification process 124) may identify sets of table elements using the correlation matrices. A set of table elements may be determined for each correlation matrix that is determined. At operation 318, the computing system 102 (e.g. the bounding box process 126) may generate bounding box data for the table elements identified at operation 316.

Figure 4:
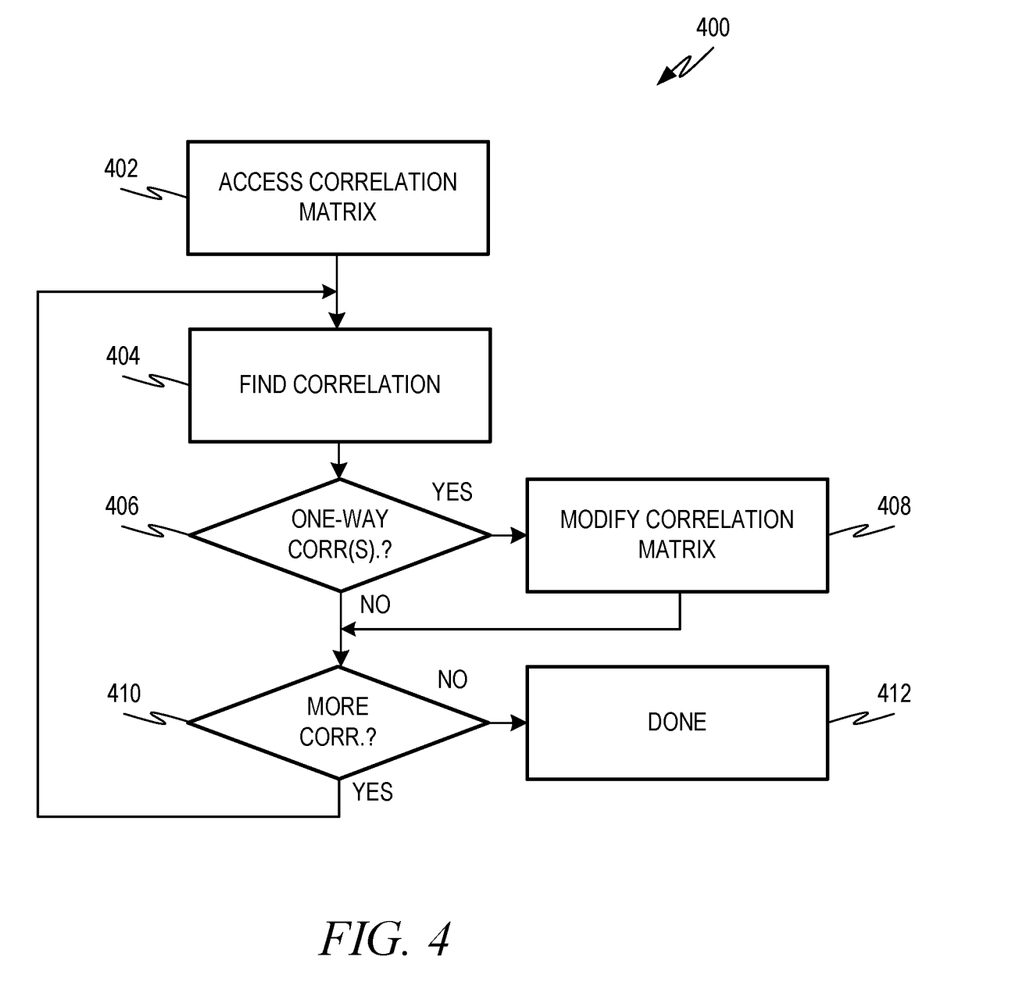
FIG. 4 is a flowchart showing one example of a process flow that may be executed in the environment of FIG. 1 to execute connected component corrections at a correlation matrix.

FIG. 4 is a flowchart showing one example of a process flow 400 that may be executed in the environment 100 of FIG. 1 to execute connected component corrections at a correlation matrix. For example, the process flow 400 shows one example way that the computing system 102 can perform the operation 314 of the process flow 300. It will be appreciated that the connected component correction may be performed, for example, by the table detection model 118 and, in some examples, by the attention process 146 and/or the cluster identification process 124.

At operation 402, the computing system 102 may access a correlation matrix. At operation 404, the computing system 102 may find a correlation indicated by the correlation matrix. This may include identifying an element in the correlation matrix having a value indicating correlation between the corresponding to words, such as an element value greater than 0.5. At operation 406, the computing system 102 may determine whether the correlation is a one way correlation. A correlation may be a one way correlation if the second elements corresponding to the same two words does not indicate a correlation.

If a one way correlation is determined at operation 406, then the computing system 102 may modify the correlation matrix at operation 408. Modifying the correlation matrix may include modifying the element value for one or both of the elements corresponding to a pair of words. In some examples, the element that does not indicate a correlation is modified to indicate a correlation. In other examples, the element that does indicate a correlation is modified to indicate no correlation. In some examples, the computing system 102 may determine whether to modify the element indicating no correlation or the element indicating correlation based on the values of the respective elements. For example, if the sum of the two elements is greater than one, then the element indicating no correlation may be modified to indicate correlation. If the sum of the two elements is less than one, then the element indicating correlation may be modified to indicate no correlation. If the sum of the two elements is equal to one, the computing system 102 may either modify the element indicating correlation or the element indicating no correlation.

After modifying the correlation matrix at operation 408, or if the correlation is not a one way correlation at operation 406, the computing system 102 may determine, at operation 410, if there are additional correlations to be considered at the correlation matrix. This may include determining if there are any elements of the matrix that have not been considered at operation 406. If there are no more correlations to be considered at operation 410, then the computing system 102 may conclude the connected component corrections at operation 412. If there are additional correlations to be considered, then the computing system may return to operation 404 and find a next correlation.

Figure 5:
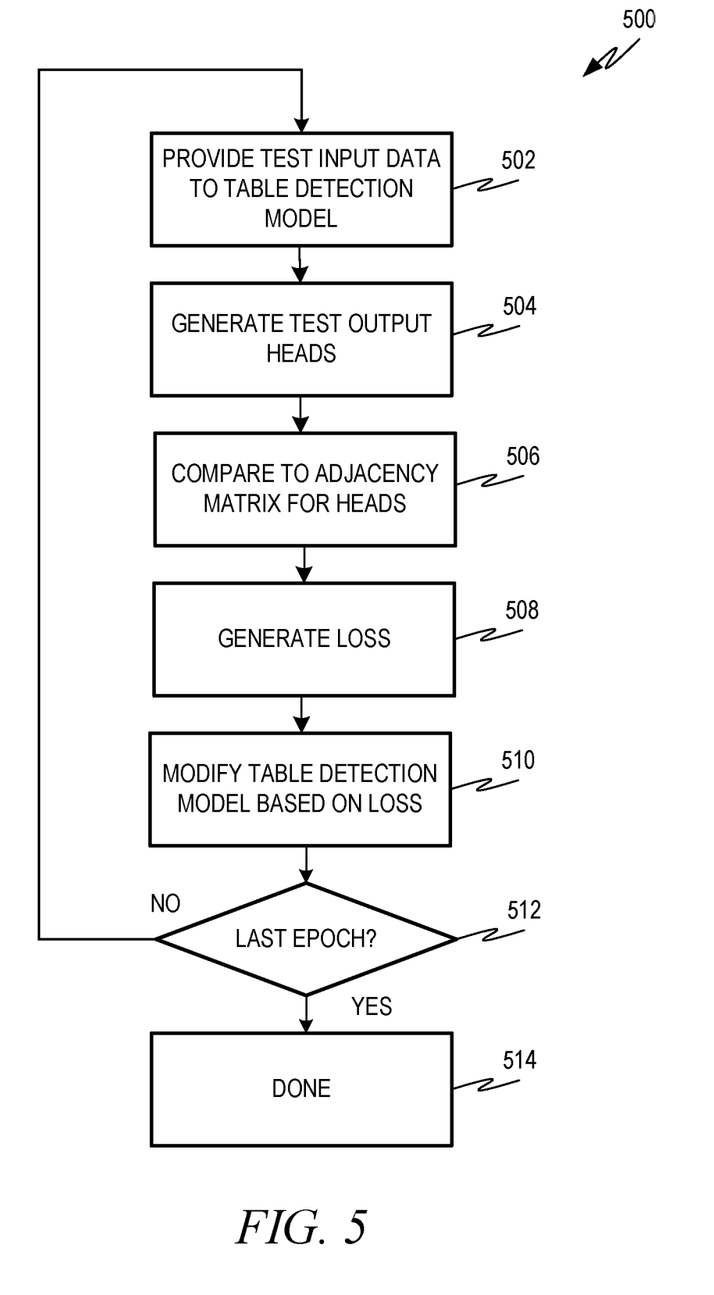
FIG. 5 is a flowchart showing one example of a process flow that may be executed in the environment of FIG. 1 to train the table detection model of FIG. 1.

FIG. 5 is a flowchart showing one example of a process flow 500 that may be executed in the environment 100 of FIG. 1 to train the table detection model 118. At operation 502 test input data may be provided to the table detection model. The test input data may comprise OCR data 112 that is associated with labeled output data, such as one or more adjacency matrices. At operation 504, the table detection model 118 may generate a test output based on the test input data.

At operation 506, the test output data may be compared to one or more adjacency matrices. An adjacency matrix may comprise elements describing how the words of the test input data should be grouped such as, for example, whether the respective words are part of a common table element and, for example, an identity of the common table element. In some examples, the adjacency matrix has binary value. For example, if two words are part of a common table elements, the value of the adjacency matrix element corresponding to the two words may equal 1, and 0 otherwise. In some examples, test input data may be accompanied by a number of adjacency matrices, with each head of the head layer corresponding to one of the adjacency matrices.

At operation 508, the computing system 102 may generate a loss based on the comparison of the test output to the adjacency matrix or matrices. In some examples, a separate loss may be determined for each head. In some examples, the loss is determined using elementwise binary cross entropy. For example, if a matrix element at (i, j) has a predicted value of $p \in (0, 1)$, then the loss is $-\log(p)$ if the label in the respective adjacency matrix in that position is equal to 1, and $-\log(1-p)$ otherwise. The loss may be computed elementwise square matrices representing the predicted $\sigma(QK^T)$ and the adjacency matrix), and then aggregated (e.g. via sum).

At operation 510, the computing system 102 may modify the table detection model 118 based on the loss generated at operation 508. Modifying the table detection model at the respective layers 128, 130, 132, 122. In some examples, the common layers 128, 130, 132 and the respective heads 134, 136, 138, 140, 142, 144 may be modified separately. For example, the common layers 128, 130, 132 may be modified based on the results of all of the heads 134, 136, 138, 140, 142, 144 while each individual head may be modified on a separate loss determined using the adjacency matrix for the table element associated with that head 134, 136, 138, 140, 142, 144.

At operation 512, the computing system 102 may determine if the current epoch is the last epoch for the training. If the current epoch is the last epoch, then the process flow 500 may conclude at operation 514. If the last epoch is not the last epoch, then the computing system 102 may return to operation 502 and provide new test input data to the table detection model.

EXAMPLES

Example 1 is a system for determining table data from a document image depicting a plurality of words and at least one table comprising at least a portion of the plurality of words, the system comprising: at least one processor programmed to perform operations comprising: accessing Optical Character Recognition (OCR) data determined based on the document image, the OCR data comprising a plurality of word records, a first word record of the plurality of word records comprising first location data describing a location of a first word of the plurality of words depicted by the document image and first content data indicating an identity of the first word; and executing a table detection model based at least in part on the OCR data, the table detection model comprising a plurality of sequential layers, the executing of the table detection model comprising: accessing an output of a first head layer of the table detection model, the output of the first head layer comprising a first head layer output matrix: generating, from the first head layer output matrix, a first head first matrix and a first head second matrix, the first head first matrix and the first head second matrix having a common shape: using the first head first matrix and the first head second matrix to generate a table correlation matrix, the table correlation matrix having a plurality of entries, a first entry of the table correlation matrix corresponding to a first combination of two words depicted by the document image; and using the table correlation matrix to determine a subset of the plurality of words that are part of a first table depicted by the document image.

In Example 2, the subject matter of Example 1 optionally includes the operations further comprising: accessing an output of a second head layer of the table detection model, the output of the second head layer comprising a second head layer output matrix: generating, from the second head layer output matrix, a second head first matrix and a second head second matrix, the second head first matrix and the second head second matrix having a common shape; using the second head first matrix and the second head second matrix to generate a row correlation matrix, the row correlation matrix having a plurality of entries, a first entry of the row correlation matrix corresponding to a first combination of two words depicted by the document image; and using the row correlation matrix to determine a subset of the plurality of words that are part of a first row of the first table depicted by the document image.

In Example 3, the subject matter of any one or more of Examples 1-2 optionally includes the operations further comprising: accessing an output of a third head layer of the table detection model, the output of the third head layer comprising a third head layer output matrix: generating, from the third head layer output matrix, a third head first matrix and a third head second matrix, the third head first matrix and the third head second matrix having a common shape; using the third head first matrix and the third head second matrix to generate a column correlation matrix, the column correlation matrix having a plurality of entries, a first entry of the column correlation matrix corresponding to a first combination of two words depicted by the document image; and using the column correlation matrix to determine a subset of the plurality of words that are part of a first column of the first table depicted by the document image.

In Example 4, the subject matter of any one or more of Examples 1-3 optionally includes the common shape being a shape of the first head layer output matrix divided by two.

In Example 5, the subject matter of any one or more of Examples 1-4 optionally includes the operations further comprising determining a bounding box for the first table, the bounding box being based at least in part on location data for the subset of the plurality of words.

In Example 6, the subject matter of any one or more of Examples 1-5 optionally includes the determining of the subset of the plurality of words that are part of the first table comprising using the table correlation matrix comprises generating a plurality of clusters using the table correlation matrix, a first cluster of the plurality of clusters comprising the subset of the plurality of words that are part of the first table and a second cluster of the plurality of clusters comprising a subset of the plurality of words that are part of a second table depicted by the document image.

In Example 7, the subject matter of any one or more of Examples 1-6 optionally includes the operations further comprising: generating a test output at least in part by providing test input data to the table detection model; comparing the test output to at least one adjacency matrix, the at least one adjacency matrix indicating words from the plurality of words that are part of the first table; determining a loss based at least in part on the comparing of the test output to the at least one adjacency matrix; and modifying the table detection model based at least in part on the loss.

In Example 8, the subject matter of any one or more of Examples 1-7 optionally includes the operations further comprising: determining that the first entry of the plurality of entries of the table correlation matrix indicates correlation between a first word and a second word: determining that a second entry of the plurality of entries corresponding to the first word and the second word does not indicate a correlation between the first word and the second word; and modifying the second entry to indicate the correlation between the first word and the second word.

Example 9 is a method for determining table data from a document image depicting a plurality of words and at least one table comprising at least a portion of the plurality of words, the method comprising: accessing Optical Character Recognition (OCR) data determined based on the document image, the OCR data comprising a plurality of word records, a first word record of the plurality of word records comprising first location data describing a location of a first word of the plurality of words depicted by the document image and first content data indicating an identity of the first word; and executing a table detection model based at least in part on the OCR data, the table detection model comprising a plurality of sequential layers, the executing of the table detection model comprising: accessing an output of a first head layer of the table detection model, the output of the first head layer comprising a first head layer output matrix; generating, from the first head layer output matrix, a first head first matrix and a first head second matrix, the first head first matrix and the first head second matrix having a common shape; using the first head first matrix and the first head second matrix to generate a table correlation matrix, the table correlation matrix having a plurality of entries, a first entry of the table correlation matrix corresponding to a first combination of two words depicted by the document image; and using the table correlation matrix to determine a subset of the plurality of words that are part of a first table depicted by the document image.

In Example 10, the subject matter of Example 9 optionally includes accessing an output of a second head layer of the table detection model, the output of the second head layer comprising a second head layer output matrix; generating, from the second head layer output matrix, a second head first matrix and a second head second matrix, the second head first matrix and the second head second matrix having a common shape; using the second head first matrix and the second head second matrix to generate a row correlation matrix, the row correlation matrix having a plurality of entries, a first entry of the row correlation matrix corresponding to a first combination of two words depicted by the document image; and using the row correlation matrix to determine a subset of the plurality of words that are part of a first row of the first table depicted by the document image.

In Example 11, the subject matter of any one or more of Examples 9-10 optionally includes accessing an output of a third head layer of the table detection model, the output of the third head layer comprising a third head layer output matrix; generating, from the third head layer output matrix, a third head first matrix and a third head second matrix, the third head first matrix and the third head second matrix having a common shape: using the third head first matrix and the third head second matrix to generate a column correlation matrix, the column correlation matrix having a plurality of entries, a first entry of the column correlation matrix corresponding to a first combination of two words depicted by the document image; and using the column correlation matrix to determine a subset of the plurality of words that are part of a first column of the first table depicted by the document image.

In Example 12, the subject matter of any one or more of Examples 9-11 optionally includes the common shape being a shape of the first head layer output matrix divided by two.

In Example 13, the subject matter of any one or more of Examples 9-12 optionally includes determining a bounding box for the first table, the bounding box being based at least in part on location data for the subset of the plurality of words.

In Example 14, the subject matter of any one or more of Examples 9-13 optionally includes the determining of the subset of the plurality of words that are part of the first table comprising using the table correlation matrix comprises generating a plurality of clusters using the table correlation matrix, a first cluster of the plurality of clusters comprising the subset of the plurality of words that are part of the first table and a second cluster of the plurality of clusters comprising a subset of the plurality of words that are part of a second table depicted by the document image.

In Example 15, the subject matter of any one or more of Examples 9-14 optionally includes generating a test output at least in part by providing test input data to the table detection model; comparing the test output to at least one adjacency matrix, the at least one adjacency matrix indicating words from the plurality of words that are part of the first table; determining a loss based at least in part on the comparing of the test output to the at least one adjacency matrix; and modifying the table detection model based at least in part on the loss.

In Example 16, the subject matter of any one or more of Examples 9-15 optionally includes determining that the first entry of the plurality of entries of the table correlation matrix indicates correlation between a first word and a second word: determining that a second entry of the plurality of entries corresponding to the first word and the second word does not indicate a correlation between the first word and the second word; and modifying the second entry to indicate the correlation between the first word and the second word.

Example 17 is a non-transitory machine-readable medium comprising instructions thereon that, when executed by at least one processor, because the at least one processor to perform operations comprising: accessing Optical Character Recognition (OCR) data determined based on a document image, the OCR data comprising a plurality of word records, a first word record of the plurality of word records comprising first location data describing a location of a first word of the plurality of words depicted by the document image and first content data indicating an identity of the first word; and executing a table detection model based at least in part on the OCR data, the table detection model comprising a plurality of sequential layers, the executing of the table detection model comprising: accessing an output of a first head layer of the table detection model, the output of the first head layer comprising a first head layer output matrix; generating, from the first head layer output matrix, a first head first matrix and a first head second matrix, the first head first matrix and the first head second matrix having a common shape; using the first head first matrix and the first head second matrix to generate a table correlation matrix, the table correlation matrix having a plurality of entries, a first entry of the table correlation matrix corresponding to a first combination of two words depicted by the document image; and using the table correlation matrix to determine a subset of the plurality of words that are part of a first table depicted by the document image.

In Example 18, the subject matter of Example 17 optionally includes the operations further comprising: accessing an output of a second head layer of the table detection model, the output of the second head layer comprising a second head layer output matrix; generating, from the second head layer output matrix, a second head first matrix and a second head second matrix, the second head first matrix and the second head second matrix having a common shape; using the second head first matrix and the second head second matrix to generate a row correlation matrix, the row correlation matrix having a plurality of entries, a first entry of the row correlation matrix corresponding to a first combination of two words depicted by the document image; and using the row correlation matrix to determine a subset of the plurality of words that are part of a first row of the first table depicted by the document image.

In Example 19, the subject matter of any one or more of Examples 17-18 optionally includes the operations further comprising: accessing an output of a third head layer of the table detection model, the output of the third head layer comprising a third head layer output matrix; generating, from the third head layer output matrix, a third head first matrix and a third head second matrix, the third head first matrix and the third head second matrix having a common shape; using the third head first matrix and the third head second matrix to generate a column correlation matrix, the column correlation matrix having a plurality of entries, a first entry of the column correlation matrix corresponding to a first combination of two words depicted by the document image; and using the column correlation matrix to determine a subset of the plurality of words that are part of a first column of the first table depicted by the document image.

In Example 20, the subject matter of any one or more of Examples 17-19 optionally includes the common shape being a shape of the first head layer output matrix divided by two.

In view of the disclosure above, various examples are set forth below. It should be noted that one or more features of an example, taken in isolation or combination, should be considered within the disclosure of this application.

Figure 6:
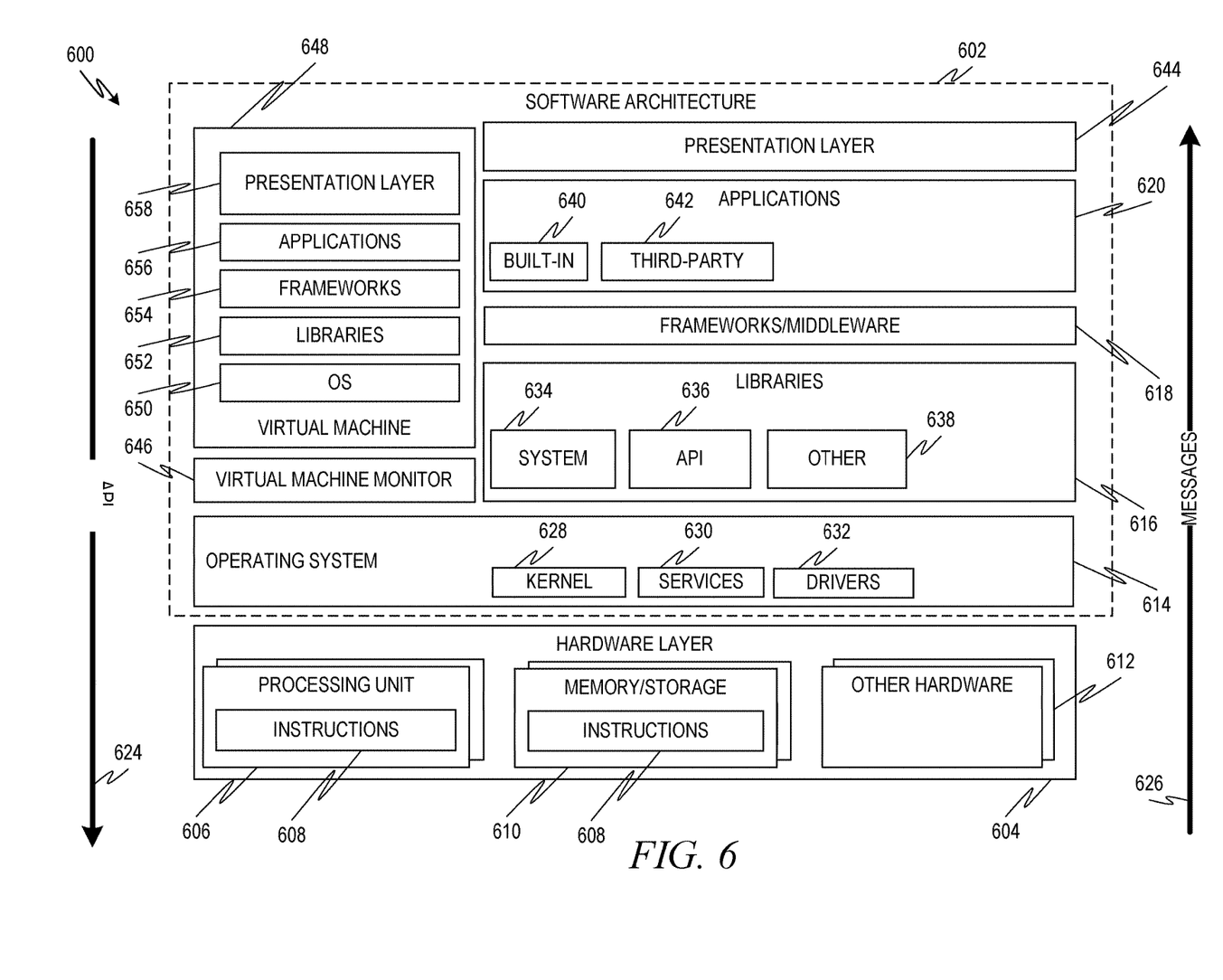
FIG. 6 is a block diagram showing one example of an architecture for a computing device.

FIG. 6 is a block diagram 600 showing one example of an architecture 602 for a computing device. The architecture 602 may be used in conjunction with various hardware architectures, for example, as described herein. FIG. 6 is merely a non-limiting example of an architecture and many other architectures may be implemented to facilitate the functionality described herein. An example hardware layer 604 is illustrated and can represent, for example, any of the above referenced computing devices. In some examples, the hardware layer 604 may be implemented according to the architecture of the computer system of FIG. 7.

The hardware layer 604 comprises one or more processing units 606 having associated executable instructions 608. Executable instructions 608 represent the executable instructions of the architecture 602, including implementation of the methods, modules, subsystems, components, and so forth described herein and may also include memory and/or storage modules 610, which also have executable instructions 608. Hardware layer 604 may also comprise other hardware as indicated by other hardware 612 which represents any other hardware of the hardware layer 604, such as the other hardware illustrated as part of the architecture 602.

In the example architecture of FIG. 6, the architecture 602 may be conceptualized as a stack of layers where each layer provides particular functionality. For example, the architecture 602 may include layers such as an operating system 614, libraries 616, middleware layer 618, applications 620, and presentation layer 644. Operationally, the applications 620 and/or other components within the layers may invoke API calls 624 through the software stack and access a response, returned values, and so forth illustrated as messages 626 in response to the API calls 624. The layers illustrated are representative in nature and not all software architectures have all layers. For example, some mobile or special purpose operating systems may not provide a middleware layer 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. In some examples, the services 630 include an interrupt service. The interrupt service may detect the receipt of an interrupt and, in response, cause the architecture 602 to pause its current processing and execute an interrupt service routine (ISR) when an interrupt is accessed.

The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than to interface directly with operating system 614 functionality (e.g., kernel 628, services 630 and/or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The middleware layer 618 (also sometimes referred to as frameworks) may provide a higher-level common infrastructure that may be utilized by the applications 620 and/or other software components/modules. For example, the middleware layer 618 may provide various graphic user interface (GUI) functions, high-level resource management, high-level location services, and so forth. The middleware layer 618 may provide a broad spectrum of other APIs that may be utilized by the applications 620 and/or other software components/modules, some of which may be specific to a particular operating system or platform.

The applications 620 include built-in applications 640 and/or third-party applications 642. Examples of built-in applications 640 may include, but are not limited to, a contacts application, a browser application, a book reader application, a location application, a median application, a messaging application, and/or a game application. Third-party applications 642 may include any of the built-in applications 640 as well as a broad assortment of other applications. In a specific example, the third-party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 642 may invoke the API calls 624 provided by the mobile operating system such as operating system 614 to facilitate functionality described herein.

The applications 620 may utilize built-in operating system functions (e.g., kernel 628, services 630, and/or drivers 632), libraries (e.g., system 634, API libraries 636, and other libraries 638), and middleware layer 618 to create user interfaces to interact with users of the system. Alternatively, or additionally, in some systems interactions with a user may occur through a presentation layer, such as presentation layer 644. In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware computing device. A virtual machine is hosted by a host operating system (operating system 614) and typically, although not always, has a virtual machine monitor 646, which manages the operation of the virtual machine 648 as well as the interface with the host operating system (i.e., operating system 614). An architecture executes within the virtual machine such as an operating system 650, libraries 652, frameworks/middleware 654, applications 656 and/or presentation layer 658. These layers of architecture executing within the virtual machine 648 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and
Machine-Readable Medium

Figure 7:
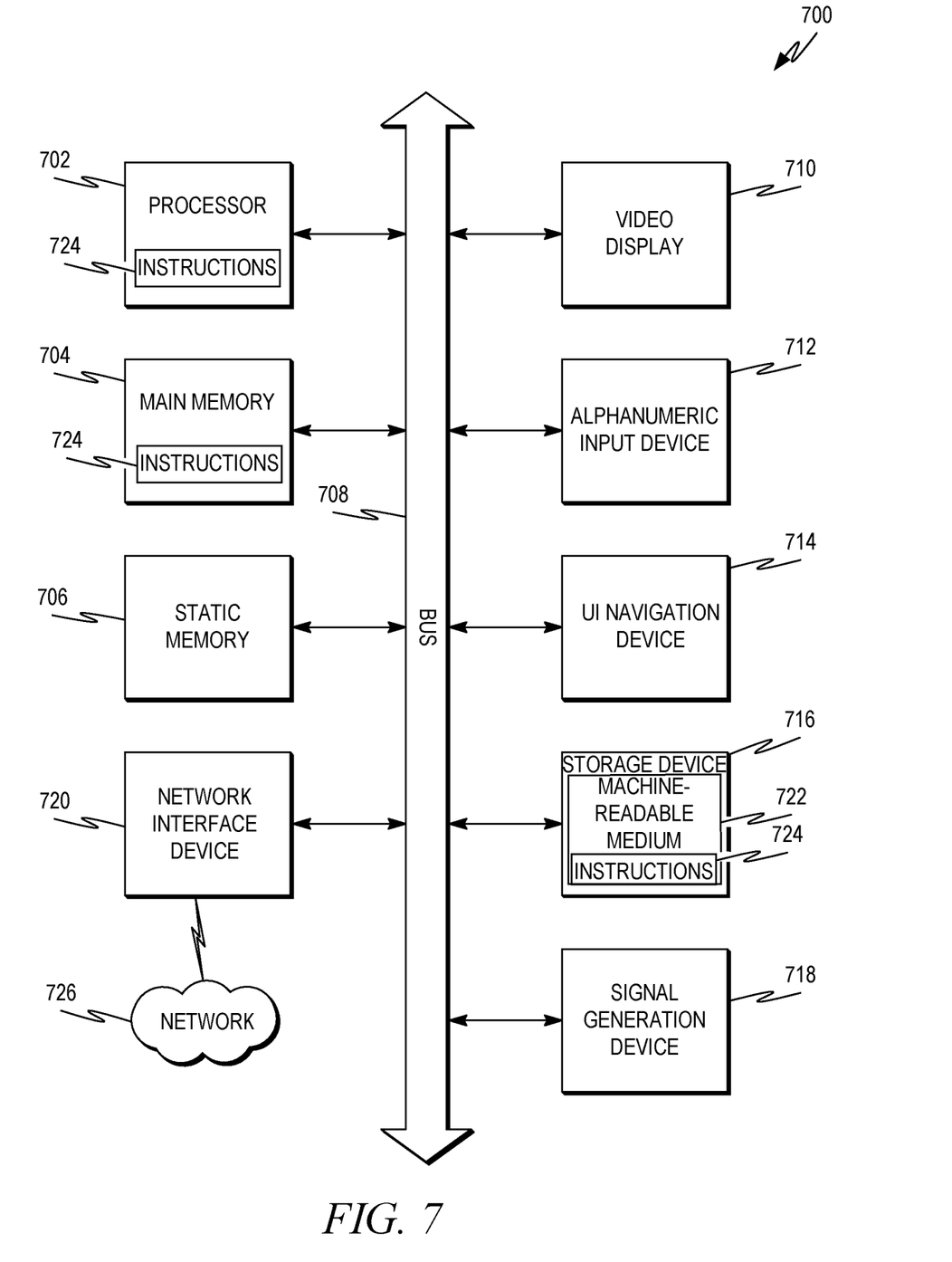
FIG. 7 is a block diagram of a machine in the example form of a computer system within which instructions may be executed for causing the machine to perform any one or more of the methodologies discussed herein.

FIG. 7 is a block diagram of a machine in the example form of a computer system 700 within which instructions 724 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation (or cursor control) device 714 (e.g., a mouse), a disk drive unit 716, a signal generation device 718 (e.g., a speaker), and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding, or carrying instructions 724 for execution by the machine and that cause the machine to perform any one or more of the methodologies of the present disclosure, or that is capable of storing, encoding, or carrying data structures utilized by or associated with such instructions 724. The term "machine-readable medium" shall accordingly be taken to include, but not be limited to, solid-state memories, and optical and magnetic media. Specific examples of machine-readable media, such as medium 722 and the like include non-volatile memory, including by way of example semiconductor memory devices, e.g., erasable programmable read-only memory (EPROM), electrically erasable programmable read-only memory (EEPROM), and flash memory devices: magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 724 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for determining table data from a document image depicting a plurality of words and at least one table comprising at least a portion of the plurality of words, the system comprising:
at least one processor programmed to perform operations comprising:
accessing Optical Character Recognition (OCR) data determined based on the document image, the OCR data comprising a plurality of word records, a first word record of the plurality of word records comprising first location data describing a location of a first word of the plurality of words depicted by the document image and first content data indicating an identity of the first word; and
executing a table detection model based at least in part on the OCR data, the table detection model comprising a plurality of sequential layers, the executing of the table detection model comprising:
accessing an output of a first head layer of the table detection model, the output of the first head layer comprising a first head layer output matrix;
generating, from the first head layer output matrix, a first head first matrix and a first head second matrix, the first head first matrix and the first head second matrix having a common shape;
using the first head first matrix and the first head second matrix to generate a table correlation matrix, the table correlation matrix having a plurality of entries, a first entry of the table correlation matrix corresponding to a first combination of two words depicted by the document image; and using the table correlation matrix to determine a subset of the plurality of words that are part of a first table depicted by the document image.

2. The system of claim 1, the operations further comprising:

accessing an output of a second head layer of the table detection model, the output of the second head layer comprising a second head layer output matrix;

generating, from the second head layer output matrix, a second head first matrix and a second head second matrix, the second head first matrix and the second head second matrix having a common shape;

using the second head first matrix and the second head second matrix to generate a row correlation matrix, the row correlation matrix having a plurality of entries, a first entry of the row correlation matrix corresponding to a first combination of two words depicted by the document image; and using the row correlation matrix to determine a subset of the plurality of words that are part of a first row of the first table depicted by the document image.

3. The system of claim 1, the operations further comprising:

accessing an output of a third head layer of the table detection model, the output of the third head layer comprising a third head layer output matrix;

generating, from the third head layer output matrix, a third head first matrix and a third head second matrix, the third head first matrix and the third head second matrix having a common shape;

using the third head first matrix and the third head second matrix to generate a column correlation matrix, the column correlation matrix having a plurality of entries, a first entry of the column correlation matrix corresponding to a first combination of two words depicted by the document image; and using the column correlation matrix to determine a subset of the plurality of words that are part of a first column of the first table depicted by the document image.

4. The system of claim 1, the common shape being a shape of the first head layer output matrix divided by two.

5. The system of claim 1, the operations further comprising determining a bounding box for the first table, the bounding box being based at least in part on location data for the subset of the plurality of words.

6. The system of claim 1, the determining of the subset of the plurality of words that are part of the first table comprising using the table correlation matrix comprises generating a plurality of clusters using the table correlation matrix, a first cluster of the plurality of clusters comprising the subset of the plurality of words that are part of the first table and a second cluster of the plurality of clusters comprising a subset of the plurality of words that are part of a second table depicted by the document image.

7. The system of claim 1, the operations further comprising:

generating a test output at least in part by providing test input data to the table detection model;

comparing the test output to at least one adjacency matrix, the at least one adjacency matrix indicating words from the plurality of words that are part of the first table;

determining a loss based at least in part on the comparing of the test output to the at least one adjacency matrix; and modifying the table detection model based at least in part on the loss.

8. The system of claim 1, the operations further comprising:

determining that the first entry of the plurality of entries of the table correlation matrix indicates correlation between a first word and a second word;

determining that a second entry of the plurality of entries corresponding to the first word and the second word does not indicate a correlation between the first word and the second word; and modifying the second entry to indicate the correlation between the first word and the second word.

9. A method for determining table data from a document image depicting a plurality of words and at least one table comprising at least a portion of the plurality of words, the method comprising:

accessing Optical Character Recognition (OCR) data determined based on the document image, the OCR data comprising a plurality of word records, a first word record of the plurality of word records comprising first location data describing a location of a first word of the plurality of words depicted by the document image and first content data indicating an identity of the first word; and executing a table detection model based at least in part on the OCR data, the table detection model comprising a plurality of sequential layers, the executing of the table detection model comprising:

accessing an output of a first head layer of the table detection model, the output of the first head layer comprising a first head layer output matrix;

generating, from the first head layer output matrix, a first head first matrix and a first head second matrix, the first head first matrix and the first head second matrix having a common shape;

using the first head first matrix and the first head second matrix to generate a table correlation matrix, the table correlation matrix having a plurality of entries, a first entry of the table correlation matrix corresponding to a first combination of two words depicted by the document image; and using the table correlation matrix to determine a subset of the plurality of words that are part of a first table depicted by the document image.

10. The method of claim 9, further comprising:

accessing an output of a second head layer of the table detection model, the output of the second head layer comprising a second head layer output matrix;

generating, from the second head layer output matrix, a second head first matrix and a second head second matrix, the second head first matrix and the second head second matrix having a common shape;

using the second head first matrix and the second head second matrix to generate a row correlation matrix, the row correlation matrix having a plurality of entries, a first entry of the row correlation matrix corresponding to a first combination of two words depicted by the document image; and using the row correlation matrix to determine a subset of the plurality of words that are part of a first row of the first table depicted by the document image.

11. The method of claim 9, further comprising:

accessing an output of a third head layer of the table detection model, the output of the third head layer comprising a third head layer output matrix;

generating, from the third head layer output matrix, a third head first matrix and a third head second matrix, the third head first matrix and the third head second matrix having a common shape;

using the third head first matrix and the third head second matrix to generate a column correlation matrix, the column correlation matrix having a plurality of entries, a first entry of the column correlation matrix corresponding to a first combination of two words depicted by the document image; and using the column correlation matrix to determine a subset of the plurality of words that are part of a first column of the first table depicted by the document image.

12. The method of claim 9, the common shape being a shape of the first head layer output matrix divided by two.

13. The method of claim 9, further comprising determining a bounding box for the first table, the bounding box being based at least in part on location data for the subset of the plurality of words.

14. The method of claim 9, the determining of the subset of the plurality of words that are part of the first table comprising using the table correlation matrix comprises generating a plurality of clusters using the table correlation matrix, a first cluster of the plurality of clusters comprising the subset of the plurality of words that are part of the first table and a second cluster of the plurality of clusters comprising a subset of the plurality of words that are part of a second table depicted by the document image.

15. The method of claim 9, further comprising:
generating a test output at least in part by providing test input data to the table detection model;
comparing the test output to at least one adjacency matrix, the at least one adjacency matrix indicating words from the plurality of words that are part of the first table;
determining a loss based at least in part on the comparing of the test output to the at least one adjacency matrix; and
modifying the table detection model based at least in part on the loss.

16. The method of claim 9, further comprising:
determining that the first entry of the plurality of entries of the table correlation matrix indicates correlation between a first word and a second word;
determining that a second entry of the plurality of entries corresponding to the first word and the second word does not indicate a correlation between the first word and the second word; and
modifying the second entry to indicate the correlation between the first word and the second word.

17. A non-transitory machine-readable medium comprising instructions thereon that, when executed by at least one processor, because the at least one processor to perform operations comprising:
accessing Optical Character Recognition (OCR) data determined based on a document image, the OCR data comprising a plurality of word records, a first word record of the plurality of word records comprising first location data describing a location of a first word of the plurality of words depicted by the document image and first content data indicating an identity of the first word; and
executing a table detection model based at least in part on the OCR data, the table detection model comprising a plurality of sequential layers, the executing of the table detection model comprising:

accessing an output of a first head layer of the table detection model, the output of the first head layer comprising a first head layer output matrix;

generating, from the first head layer output matrix, a first head first matrix and a first head second matrix, the first head first matrix and the first head second matrix having a common shape;

using the first head first matrix and the first head second matrix to generate a table correlation matrix, the table correlation matrix having a plurality of entries, a first entry of the table correlation matrix corresponding to a first combination of two words depicted by the document image; and using the table correlation matrix to determine a subset of the plurality of words that are part of a first table depicted by the document image.

18. The non-transitory machine-readable medium of claim 17, the operations further comprising:
accessing an output of a second head layer of the table detection model, the output of the second head layer comprising a second head layer output matrix;
generating, from the second head layer output matrix, a second head first matrix and a second head second matrix, the second head first matrix and the second head second matrix having a common shape;
using the second head first matrix and the second head second matrix to generate a row correlation matrix, the row correlation matrix having a plurality of entries, a first entry of the row correlation matrix corresponding to a first combination of two words depicted by the document image; and
using the row correlation matrix to determine a subset of the plurality of words that are part of a first row of the first table depicted by the document image.

19. The non-transitory machine-readable medium of claim 17, the operations further comprising:
accessing an output of a third head layer of the table detection model, the output of the third head layer comprising a third head layer output matrix;
generating, from the third head layer output matrix, a third head first matrix and a third head second matrix, the third head first matrix and the third head second matrix having a common shape;
using the third head first matrix and the third head second matrix to generate a column correlation matrix, the column correlation matrix having a plurality of entries, a first entry of the column correlation matrix corresponding to a first combination of two words depicted by the document image; and
using the column correlation matrix to determine a subset of the plurality of words that are part of a first column of the first table depicted by the document image.

20. The non-transitory machine-readable medium of claim 17, the common shape being a shape of the first head layer output matrix divided by two.

* * * * *